United States Patent [19]

Feeney

[11] 4,402,390
[45] Sep. 6, 1983

[54] CONVEYOR ROLL

[75] Inventor: Alvan H. Feeney, Sterling Heights, Mich.

[73] Assignee: Stilson Division of Stocker & Yale, Inc., Boston, Mass.

[21] Appl. No.: 273,256

[22] Filed: Jun. 12, 1981

[51] Int. Cl.³ .............................................. B65G 13/00
[52] U.S. Cl. ................................. 193/37; 301/63 PW; 474/96
[58] Field of Search ................. 193/37, 35 R; 308/15, 308/16, 20, 237 R, 239; 474/96; 301/63 PW

[56] References Cited

U.S. PATENT DOCUMENTS 1,989,988  2/1935  Jones ...................................... 308/20
3,708,844  1/1973  Rawson ........................ 193/35 R X

FOREIGN PATENT DOCUMENTS 445400  4/1936  United Kingdom .................. 474/96

Primary Examiner—John J. Love
Assistant Examiner—Gene A. Church
Attorney, Agent, or Firm—Cullen, Sloman, Cantor, Grauer, Scott & Rutherford

[57] ABSTRACT

A conveyor roll adapted for mounting on a shaft comprises a pair of opposed roll halves of a resilient material of semi-cylindrical shape, each having a semi-cylindrical recess. A pair of opposed semi-cylindrical metal insert halves are nested and secured within each roll half and have assembly ends projecting axially outward of the roll halves. Each insert half has an elongated semi-cylindrical recess snugly receiving said shaft. Fasteners interconnect the assembly ends of the inserts securing the inserts together upon the shaft and securing the roll halves together.

8 Claims, 7 Drawing Figures

CONVEYOR ROLL

BACKGROUND OF THE INVENTION

In shaft mounted multiple roll material handling operations including conveyor rolls, belt idlers and die lifters, it has been the practice when replacing damaged or worn rolls, to shut the operation down while the shafts are pulled and the rolls replaced. This is a time consuming operation.

SUMMARY OF THE INVENTION

An important feature of the present invention is to provide a conveyor roll which consists of a pair of split separable roll halves of a resilient material of a semi-cylindrical shape, each having a semi-cylindrical recess adapted to receive therein and have bonded thereto respectively a pair of opposed semi-cylindrical metal insert halves. End portions of the inserts project outwardly of the roll halves. The inserts each having a semi-cylindrical recess adapted to be positioned around a shaft. Fastening means interconnect the insert ends for securing the inserts together upon and around the shaft and for securing the roll halves to eachother. A further feature is to provide a conveyor roll which consists of a pair of split opposed roll halves, so that such rolls, if damaged or worn can be quickly replaced. Shaft pulling is entirely eliminated and down time is minimized.

A further feature includes the use of four fasteners or screws on the inserts that are simply loosened and the roll is split in half and removed. A new split roll is put in place, the screws tightened down and the inserts connected to the rolls fixedly secured again to the shaft. It is a further feature to provide a fastening means for interconnecting the opposed pair of semi-cylindrical inserts at opposite ends thereof, wherein there are opposed aligned bores extending through the insert ends transversely of the length of the inserts, one of the bores being internally threaded, and wherein a plurality of socket headed screws are respectively projected through the first bore and threaded into the second bore. This fixedly secures the insert halves together and to the included rotatable shaft, and at the same time fixedly secures the roll halves together to provide a continuous roller. A further feature includes the reusability of the steel or aluminum inserts onto which can be remolded a new roll half at a fraction of the cost of new rolls.

These and other features will be seen from the following specification and claims in conjunction with the appended drawings.

THE DRAWINGS

It will be understood that the above drawings illustrate merely a preferred embodiment of the invention, and that other embodiments are contemplated within the scope of the claims hereafter set forth.

DETAILED DESCRIPTION OF AN EMBODIMENT OF THE INVENTION

Figure 2:
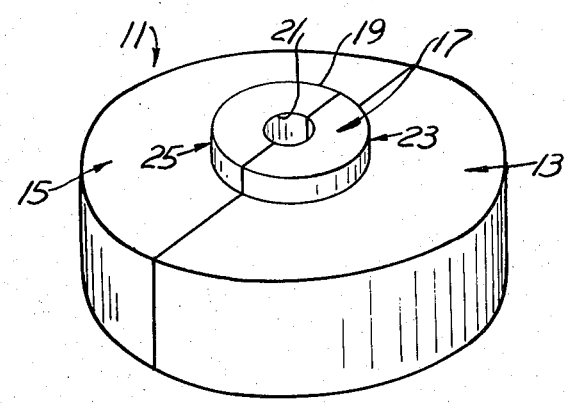
FIG. 2 is a similar view of the conveyor roll as assembled.
Figure 1:
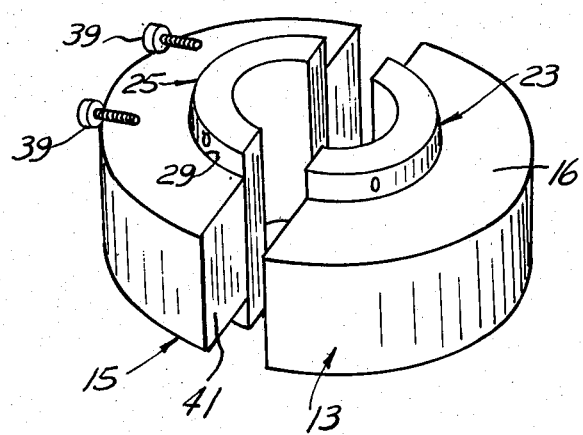
FIG. 1 is a perspective exploded view of the present conveyor roll before assembly.

Referring to the drawings, the present conveyor roller 11, sometimes referred to as a cushion roll, shown in FIG. 2 assembled and in FIG. 1 as disassembled and consisting of a pair of symmetrical roll halves. The present conveyor roll comprises a pair of opposed symmetrical roll halves 13 and 15 of a resilient material and of semi-cylindrical shape including parallel end walls 16. Each of the semi-cylindrical roll halves has a semi-cylindrical recess and mold area 29 between which when assembled, there is provided a two piece cylindrical insert 17 of aluminum or steel, which is of split form and includes semi-cylindrical insert halves 23 and 25. The assembled insert 17, shown in FIG. 2, has an outside diameter 19, FIG. 2, adapted for cooperative registry within the corresponding opposed semi-cylindrical recesses 29 within the roll halves 13 and 15.

Figure 3:
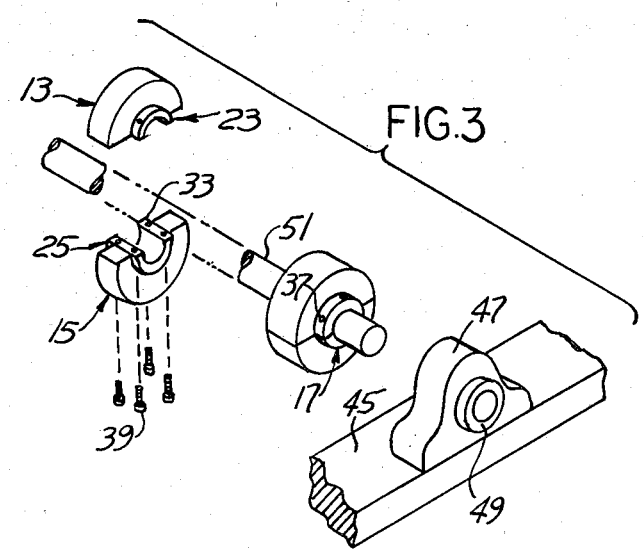
FIG. 3 is a fragmentary exploded view of the roll shaft onto which a plurality of split rolls are assembled and secured, one of the split rolls being shown separated and one of the split rolls assembled on the shaft.

The insert halves have an interior diameter or bore 21 formed by semi-cylindrical recesses upon the interior of the respective inserts, which are adapted for positioning around and securing to the conveyor shaft 51, shown in FIG. 3. The respective semi-cylindrical metallic inserts 23 and 25 are respectively bonded to the corresponding roll halves 13 and 15 in the areas shown at 29, FIG. 4. End portions of the insert halves project axially outwardly of the side walls 16 of the assembled conveyor roll and form a pair of opposed insert ends or assembly ends 27, FIG. 5, which are adapted to be suitably secured together by the fasteners 39.

Figure 4:
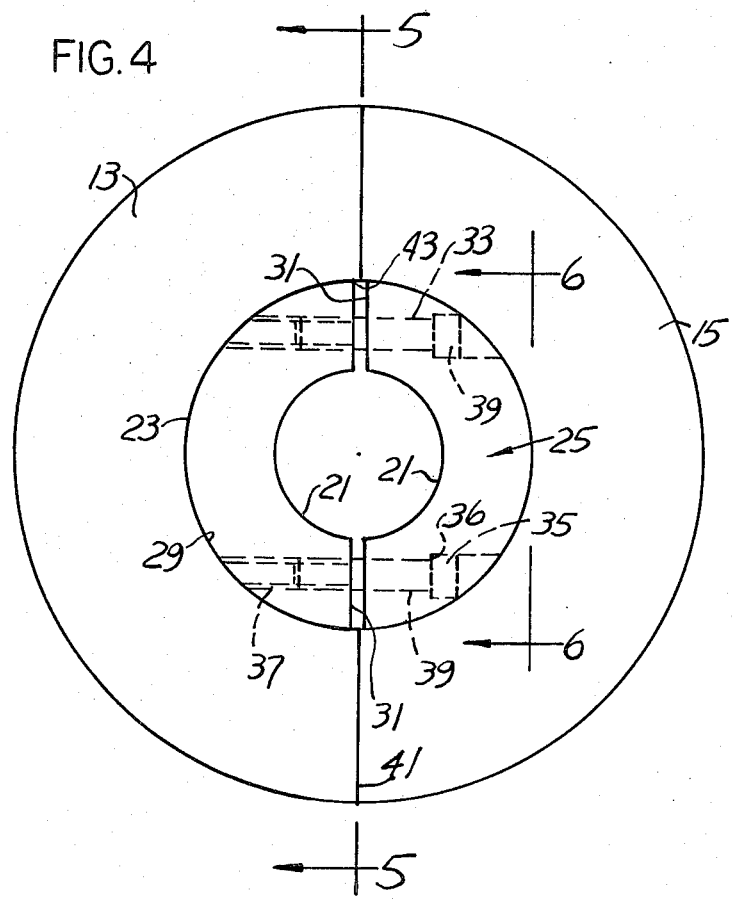
FIG. 4 is a side elevational view of the assembled split roll shown in FIG. 2.

The corresponding semi-cylindrical recesses 21 within the insert halves 23 and 25 define therein the opposed end faces 31, FIG. 4, adapted for cooperative registry when the roll halves are assembled as shown in FIG. 2. One of the insert halves at their opposite assembly ends 27 have a pair of transverse bores 33 extending at right angles to the end faces 31 and at their outer ends a counterbore 35 defining a stop shoulder 36.

Aligned with the respective bores 33, the other opposing insert ends have threaded bores 37. The socket headed screws 39 extend through bores 33 and are threaded into bores 37, with the socket head of the screw operatively engaging shoulder 36 in FIG. 4 until the respective insert halves are drawn tightly together as shown in FIGS. 2 and 3.

Within the respective roll halves 13 and 15 and defined by the internal semi-cylindrical recess 29 therein, there is provided a pair of rectangular end faces 41, FIG. 4, adapted for cooperative registry when assembled as shown in FIG. 2. Further shown in FIG. 4, end faces 41 of the roll halves project outwardly of the corresponding end face 31 of the inserts, whereby on tightening of the socket headed screws 39, said roll halves are secured together in compression.

In use, the respective roll halves 13 and 15 with their integral molded on inserts 23 and 25, are positionable upon and around opposite sides of shaft 51, fragmentarily shown in FIG. 3, and the screws 39, assembled within the corresponding bores, 33, 37 and drawn together. Thus the respective opposed insert halves are secured together and to the shaft 51 for rotation there-with. At the same time, the corresponding roll halves are secured together in the manner shown in FIGS. 2 and 3.

Shaft 51 forming a part of a roller conveyor 45, is supported at or adjacent its ends within bearings 49 within the pillow blocks 47, secured to and mounted upon said conveyor, fragmentarily shown.

In use, conveyors of this type are referred to as multiple roll materials handling devices wherein there are a series of shafts 51, normally parallel spaced and journalled for rotation upon the conveyor 45. There are at least spaced pairs of split rolls 13-15 secured upon the respective shafts to form the unit roll shown in FIGS. 2 and 3.

When the split roll becomes damaged or worn, it is easily replaced by removing the screws 39 and disassembling the split roll. This is done with a minimum of shut down time and the shaft 51 need not be pulled for replacement of the rolls. Shaft pulling is eliminated. When the assembled roll is removed, new roll halves are put in place and the screws retightened. The present split rolls are adapted for use in conjunction with conveyor rolls, belt idlers and die lifters, etc.

The insert halves 23 and 25 are reusable and a new roll half may be molded thereto for a fraction of the cost of new rolls.

Figure 5:
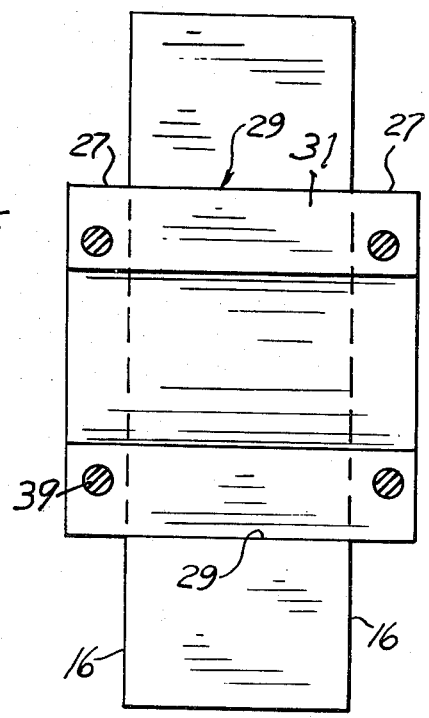
FIG. 5 is a vertical section taken in the direction of arrows 5—5 of FIG. 4.
Figure 6:
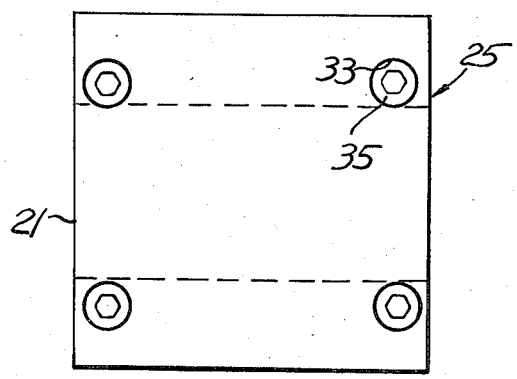
FIG. 6 is an end view of the roll insert taken in the direction of arrows 6—6 of FIG. 4.
Figure 7:
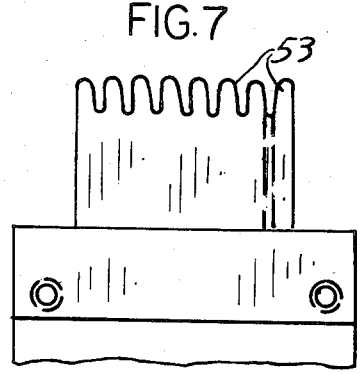
FIG. 7 is a fragmentary view of a roll half having a series of parallel spaced peripheral fins.

The split roll cross section is rectangular, such as shown in FIG. 5, however, in FIG. 7 there is shown a modification of the roll wherein the outer periphery has therein a series of parallel spaced flexible fins 53. The split roll construction is exactly the same as above described with respect to FIGS. 4 and 5.

The roll halves have been defined as of a resilient material such as Neoprene, Butyl, Buna N, Polyurethane, Silicone and Hypalon, (Trademark).

Having described my invention, reference shown now be had to the following claims.

I claim:

1. A conveyor roll adapted for mounting on a shaft comprising a pair of opposed symmetrical roll halves of a non-metallic resilient material of semi-cylindrical shape with parallel end walls, each roll half having a semi-cylindrical recess;
    a pair of opposed semi-cylindrical metal insert halves nested within and (secured within) bonded to each roll half, respectively and having assembly ends projecting axially outward of said end walls;
    each insert half having an elongated semi-cylindrical recess snugly receiving said shaft;
    and fastening means interconnecting said insert half assembly ends face to face, interconnecting said roll halves face to face and for securing the assembled roll halves and insert halves to said shaft.

2. A conveyor roll adapted for mounting on a shaft comprising a pair of opposed roll halves of a resilient material of semi-cylindrical shape having opposed sides; each roll half having a semi-cylindrical recess;
    a pair of opposed semi-cylindrical metal insert halves nested within and (secured within) bonded to each roll half respectively;
    the ends of said insert halves projecting axially outward of said sides;
    each insert half having an elongated semi-cylindrical recess receiving said shaft;
    and fastening means interconnecting said projecting insert ends face to face, interconnecting said roll halves face to face and securing the assembled roll halves and insert halves to said shaft.

3. In the conveyor roll of claim 1, the semi-cylindrical recess in each roll half defining a pair of spaced end faces;
    the semi-cylindrical recess in each insert half defining a pair of spaced end faces;
    the respective opposed end faces being in snug surface engagement to define a cylindrical conveyor roll and a cylindrical insert.

4. In the conveyor roll of claim 1, each roll half being rectangular in cross section.

5. In the conveyor roll of claim 1, there being a laterally spaced pair of aligned transverse bores in said insert half projecting ends upon opposite sides thereof, one of said aligned bores being threaded;
    said fastening means being screws projected through said bores respectively and threaded into said threaded bores respectively.

6. In the conveyor roll of claim 1, said shaft being journalled upon a pair of bearing supports;
    said conveyor roll when worn or damaged being removable from said shaft and replaceable by a disassembly and subsequent assembly of said fastening means, without disassembling said shaft.

7. In the conveyor roll of claim 3, the end faces of said roll halves projecting outwardly of said insert half end faces, the assembled roll halves when secured together being in compression.

8. A conveyor roll adapted for mounting on a shaft comprising a pair of opposed symmetrical roll halves of a non-metallic resilient material of semi-cylindrical shape with parallel end walls, each roll having a semi-cylindrical recess;
    a pair of opposed semi-cylindrical metal insert halves nested within and bonded to each roll half, respectively and having assembly ends projecting axially outward of said end walls;
    each insert half having an elongated semi-cylindrical recess snugly receiving said shaft;
    and fastening means interconnecting said insert half assembly ends face to face, interconnecting said roll halves face to face and for securing the assembled roll halves and insert halves to said shaft;
    the semi-cylindrical recess in each roll half defining a pair of spaced end faces;
    the semi-cylindrical recess in each insert half defining a pair of spaced end faces;
    the respective opposed end faces being in snug surface engagement to define a cylindrical conveyor roll and a cylindrical insert;
    each roll half being rectangular in cross-section;
    there being a laterally spaced pair of aligned transverse bores in said insert half projecting ends upon opposite sides thereof, one of said aligned bores being threaded;
    said fastening means being screws projected through said bores respectively and threaded into said threaded bores respectively.

* * * * *